(12) United States Patent
Zhang

(10) Patent No.: US 9,770,704 B2
(45) Date of Patent: Sep. 26, 2017

(54) METHOD AND DEVICE FOR REMOVING DUST AND COOLING FOR ACTIVE COKE REGENERATION APPARATUS

(75) Inventor: Dawei Zhang, Shenyang (CN)

(73) Assignees: MISSISSIPPI INTERNATIONAL WATER INC., Valley Stream, NY (US); Dawei Zhang, Shenyang (CN)

(*) Notice: Subject to any disclaimer, the term of this patent is extended or adjusted under 35 U.S.C. 154(b) by 750 days.

(21) Appl. No.: 14/347,052

(22) PCT Filed: Sep. 14, 2012

(86) PCT No.: PCT/CN2012/081408
§ 371 (c)(1),
(2), (4) Date: Jul. 11, 2014

(87) PCT Pub. No.: WO2013/044738
PCT Pub. Date: Apr. 4, 2013

(65) Prior Publication Data
US 2014/0353137 A1    Dec. 4, 2014

(30) Foreign Application Priority Data

Sep. 28, 2011    (CN) .......................... 2011 1 0303907

(51) Int. Cl.
*C10B 1/10*    (2006.01)
*B01J 20/34*    (2006.01)
(Continued)

(52) U.S. Cl.
CPC ............. *B01J 20/3416* (2013.01); *C10B 1/10* (2013.01); *C10B 39/00* (2013.01); *C10B 47/30* (2013.01);
(Continued)

(58) Field of Classification Search
CPC .......... C10B 53/04; C10B 47/30; C10B 57/02; C10B 1/10
See application file for complete search history.

(56) References Cited

U.S. PATENT DOCUMENTS 4,276,120 A * 6/1981 Lutz .......................... C10L 9/00
201/15
4,293,390 A * 10/1981 Chalmers .................. C10B 7/02
202/100

(Continued)

FOREIGN PATENT DOCUMENTS

CN    1381306 A    11/2002
CN    101462040 A    6/2009
(Continued)

OTHER PUBLICATIONS

International Search Report, mailed Dec. 27, 2012, for PCT/CN2012/081408, 6 pages.
(Continued)

*Primary Examiner* — Jonathan Miller
(74) *Attorney, Agent, or Firm* — Seed IP Law Group LLP

(57) ABSTRACT

The present invention discloses a dust removing and coding method for an active coke regeneration apparatus. When the active coke regeneration apparatus is operating, the method includes the following: generating two negative pressure regions respectively at a discharge end and a feeding end; sucking out leaked vapor and dust by means of the negative regions; and cooling down the active coke regeneration apparatus by using gas flow generated by the negative pressure. Moreover, the present invention provides a device for implementing the method as described above.

10 Claims, 2 Drawing Sheets

(51) Int. Cl.
*C10B 53/04* (2006.01)
*C10B 47/30* (2006.01)
*C10B 57/02* (2006.01)
*C10B 39/00* (2006.01)
*C02F 1/28* (2006.01)
*B01D 53/26* (2006.01)

(52) U.S. Cl.
CPC .............. *C10B 53/04* (2013.01); *C10B 57/02* (2013.01); *B01D 53/265* (2013.01); *C02F 1/283* (2013.01); *C02F 2303/16* (2013.01)

(56) References Cited

U.S. PATENT DOCUMENTS

| | | | | |
|---|---|---|---|---|
| 5,187,131 | A | * | 2/1993 | Tiggelbeck ........... C01B 31/087 210/694 |
| 8,282,787 | B2 | * | 10/2012 | Tucker .................... C10B 47/30 201/41 |
| 8,388,902 | B2 | * | 3/2013 | Zhang .................. B01J 20/3483 422/202 |
| 9,469,812 | B2 | * | 10/2016 | Tucker .................... C10B 47/30 |
| 2010/0311568 | A1 | * | 12/2010 | Zhang .................. B01J 20/3483 502/55 |

FOREIGN PATENT DOCUMENTS

| | | |
|---|---|---|
| CN | 101700482 A | 5/2010 |
| CN | 202315900 U | 7/2012 |
| DE | WO 9417919 A2 * | 8/1994 .............. B09B 3/00 |
| WO | 8701963 A1 | 4/1987 |

OTHER PUBLICATIONS

Office Action mailed Apr. 3, 2014, for CN201110303907.1 (with English translation), 10 pages.

Office Action mailed Jul. 10, 2014, for CN201110303907.1 (with English translation), 6 pages.

* cited by examiner

METHOD AND DEVICE FOR REMOVING DUST AND COOLING FOR ACTIVE COKE REGENERATION APPARATUS

BACKGROUND OF THE INVENTION

1. Field of the Invention

The present invention generally relates to material processing apparatus, more particularly, to a method for removing dust and cooling for an active coke regeneration apparatus. Also, the present invention relates to a device for implementing the above method.

2. Description of the Related Art

Active coke filtration and adsorption for treating waste water or sewage is one newly developed method for treating waste water or sewage. The active coke filtration and adsorption method is used to perform pre-treatment for water from polluted urban water sources, for removing contaminants, fungus, odor, and chroma from the water, so that the treated water reaches first class water source in terms of water-quality standards. The above pre-processed water is transported to city water supply plant where the water is further treated by a traditional process comprising the steps of coagulation, sedimentation, filtration and disinfection, ensuring that the quality of the water supplied to city dwellers can reach the latest city water supply national standard.

The urban sewage from bio-chemical treatment is deeply treated by the active coke filtration and adsorption method, for removing contaminants, fungus, odor, and chroma from the sewage, so that water quality of the treated sewage reaches class III surface water standard in table 1 (basic item standard values therein) of <<Environment Quality Standard of Surface Water>> (GB 3838-2002).

The urban sewage after bio-chemical treatment is deeply treated by the active coke filtration and adsorption method, so that water quality of the treated sewage reaches industrial water standard or national industrial pollutant emission standard.

After treating the waste water and sewage, the active coke typically is regenerated by a rotary regeneration apparatus. The rotary regeneration apparatus includes a drum, a supporting ring, a supporting roller, a gear ring, a drive motor, a thrust roller wheel, a wheel belt, a heating chamber, a feeding chamber, a discharge chamber, a vapour inlet, a sealing device, or the like. Because the drum in the rotary regeneration apparatus has an opening with a large diameter, it results in the problems such as shape error (for example, roundness, eccentric and so on) and repeatedly axial movements caused by expanding with heat and contracting with cold upon operating. Thus, the traditional sealing device cannot achieve the effect of fully sealing. During regeneration of the active coke, a mixed vapour and powders of the active coke would be leaked out from the sealing device at the connecting locations between the drum and the feeding chamber, or between the drum and the discharge chamber, wherein main constituent of the mixed vapour is water vapour. This results in heavy odor, and large amounts of powder and dust in a regeneration workshop. As a result, it causes harm as following:

1) pollution to environments of the workshop;
2) danger to health of operators in the workshop:
3) loss of the active coke
4) increasing wear of the relevant devices, since the powders of the active coke fall onto the supporting roller and the gear rings;
5) degrade of safety operation of the drive motor, because the powders of the active coke enter into the drive motor.

SUMMARY OF THE INVENTION

In view of the above, an object of the present invention is to remove or alleviate at least one aspect of the above problems and defects in the prior arts.

An object of the present invention is to provide a dust removing and cooling for an active coke regeneration apparatus.

Another object of the present invention is to provide a device for implementing the method as described above.

In order to achieve the above object, there is provided a dust removing and cooling method for an active coke regeneration apparatus, when the active coke regeneration apparatus is operating, generating two negative pressure regions respectively at a discharge end and a feeding end;

sucking out leaked-out vapour and dust by means of the negative regions; and cooling down the active coke regeneration apparatus by using gas flow generated by the negative pressure.

According to another aspect of the invention, there is provided a device for implementing the above method of the present invention comprises:

a feeding chamber and a discharge chamber, respectively provided at two opposite ends of the active coke regeneration apparatus;

a front mechanical room, located between the feeding chamber and a combustion chamber;

a rear mechanical room, located between the discharge room and the combustion chamber, wherein the combustion room is between the front mechanical room and the rear mechanical room;

a drum, extending from the feeding chamber to the discharge chamber;

a spacer plate, provided between the feeding chamber and the front mechanical room, forming a front negative pressure dust collecting chamber, and a ventilation pipe is provided in the front mechanical room, an air inlet of the ventilation pipe is located an upper part of the front mechanical room, and an air outlet of the ventilation pipe is provided in the front negative pressure dust collecting chamber;

another spacer plate, provided between the discharge chamber and the rear mechanical room, forming a rear negative pressure dust collecting chamber, and a ventilation pipe is provided in the rear mechanical room, an air inlet of the ventilation pipe is located an upper part of the rear mechanical room, and an air outlet of the ventilation pipe is provided in the rear negative pressure dust collecting chamber;

two dust collecting ports, respectively provided on top of the front and rear negative pressure dust collecting chambers and connected to a dust collecting apparatus by respective dust collecting pipelines; and a vapour outlet, provided at a side of the feeding chamber, and connected with an induced draft fan.

Specifically, sealing devices are installed inside and outside of a connecting location of the drum with the feeding chamber, and at a connecting location of the drum with the discharge chamber.

Preferably, a combustion apparatus is arranged outside the combustion chamber.

In one embodiment, a retention ring is mounted onto one end of the drum within the discharge chamber, and a striker plate in a semicircular shape is provided at an upper part of the drum.

More particularly, the front and rear mechanical rooms both are mounted with a supporting ring, a supporting roller, a ventilation pipe, a service door and a ventilation hole.

More preferably, cleaning doors are respectively located beneath the feeding chamber, at a lower part of the front negative pressure dust collecting chamber and at a lower part of the rear negative pressure dust collecting chamber.

In another embodiment, a discharge end of the drum is connected with a drive motor.

Preferably, the drive motor, the induced draft fan, the dust collecting apparatus, a water supplying pump and a pressure sensor all are connected with a control cabinet.

More preferably, the vapour outlet of the discharge chamber is installed with a pressure sensor, the vapour outlet is connected to a vapour inlet of a condenser, and a discharge port at another end of the condenser is connected with a tri-phase separator by a mixed vapour pipeline, wherein a vapour inlet on top of the tri-phase separator is connected with the induced draft fan, nozzles are installed within the condenser, respectively at a side of the vapour outlet, in a middle of the condenser, and at a side of a discharge port in the condenser, on an axis of the condenser, the nozzles being connected with a water supplying pump by a water supplying pipe.

In the present invention, two negative pressure dust collecting chambers are respectively provided between the feeding chamber and the front mechanical room, or between the discharge chamber and the rear mechanical room, which are located at two ends of the active coke regeneration apparatus. The dust collecting ports of the front and rear negative pressure dust collecting chambers are connected with the dust collecting apparatus by the pipelines. When the regeneration apparatus is in operation, the dust collecting apparatus starts to operate, so that negative pressure is formed within the front and rear negative pressure dust collecting chambers. The vapour and dust leaked from the connecting parts between the feeding chamber and the drum or between the discharge chamber and the drum, enter the front and rear negative pressure dust collecting chambers, and then are sucked out by the dust collecting apparatus. At this time, the gas flow generated by the negative pressure is used to cool down the active coke regeneration apparatus. Because the mechanical rooms and the regeneration workshop all are under atmospheric conditions, it prevents the vapour and dust entering the mechanical rooms and the regeneration workshop, under the action of the pressure difference. In addition, the dust gas is discharged from the vapour outlet and then enters the condenser. Most of the water vapour in the dust gas is converted into the condensed water in the condenser. The dust contained in the dust gas under scouring action of the condensed water and the cooling water, flows into the tri-phase separator via the mixed vapour pipeline and the gas-liquid inlet. Under the action of the fan, the cooling water, the condensed water and the dust flow into the sedimentation tank from the solid-liquid outlet in the tri-phase separator, whereas the remaining gas is discharged from the gas outlet above the tri-phase separator. Therefore, the present invention achieves the following advantages:

1) avoiding pollution to environment of the workshop;
2) ensuring health of operators in the workshop;
3) reducing the loss of the active coke, since the leaked active coke is collected by the dust collecting apparatus;
4) decreasing wear of the relevant devices, since the powders of the active coke is prevented from falling onto the supporting roller and the gear rings, or the like;
5) ensuring safety operation and service lifetime of the drive motor, because the powders of the active coke is prevented from entering the drive motor; and
(6) avoiding the dust of the dust gas attaching to the wall of the mixed vapour pipeline, which would cause the blocking of the mixed vapour pipeline, and does not discharge the dust gas in the drum in time.

Figure 1:
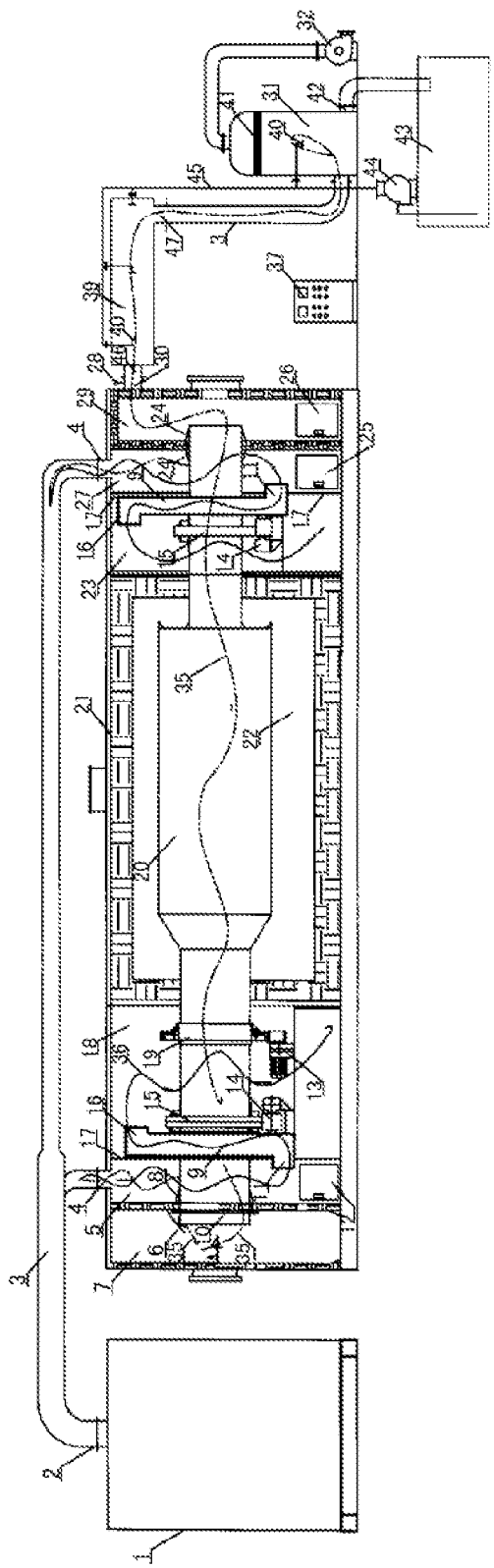
FIG. 1 is a structural schematic view of the device in accordance with the present invention.

List of reference numbers of the main components in the accompanying drawings:
1 dust collecting apparatus
2 dust collecting pipeline
3 mixed vapour pipeline
4 dust collecting port
5 rear negative pressure dust collecting chamber
6 striker plate
7 discharge chamber
8 sealing device for the discharger chamber
9 vent pipe
10 retention ring
11 air outlet
12 rear cleaning door
13 drive motor
14 supporting roller
15 supporting ring
16 air inlet
17 spacer plate
18 rear mechanical room
19 gear ring
20 drum
21 regeneration apparatus
22 combustion room
23 front mechanical room
24 sealing device of the feeding chamber
25 middle cleaning door
26 front cleaning door
27 front negative pressure dust collecting chamber
28 pressure sensor
29 feeding chamber
30 vapour outlet
31 tri-phase separator
32 induced draft fan
33 ventilation hole
34 combustion apparatus
35 dust gas
36 cooling air
37 control cabinet
38 service door
39 condenser
40 nozzle
41 defogger
42 solid-liquid outlet
43 sedimentation tank
44 water supplying pump
45 water supplying pipeline
46 vapour inlet 47 discharge port
48 gas outlet
49 gas-liquid inlet

DETAILED DESCRIPTION OF THE EMBODIMENTS

Figure 3:
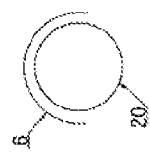
FIG. 3 is a sectional view cut along a direction A of FIG. 1.
Figure 2:
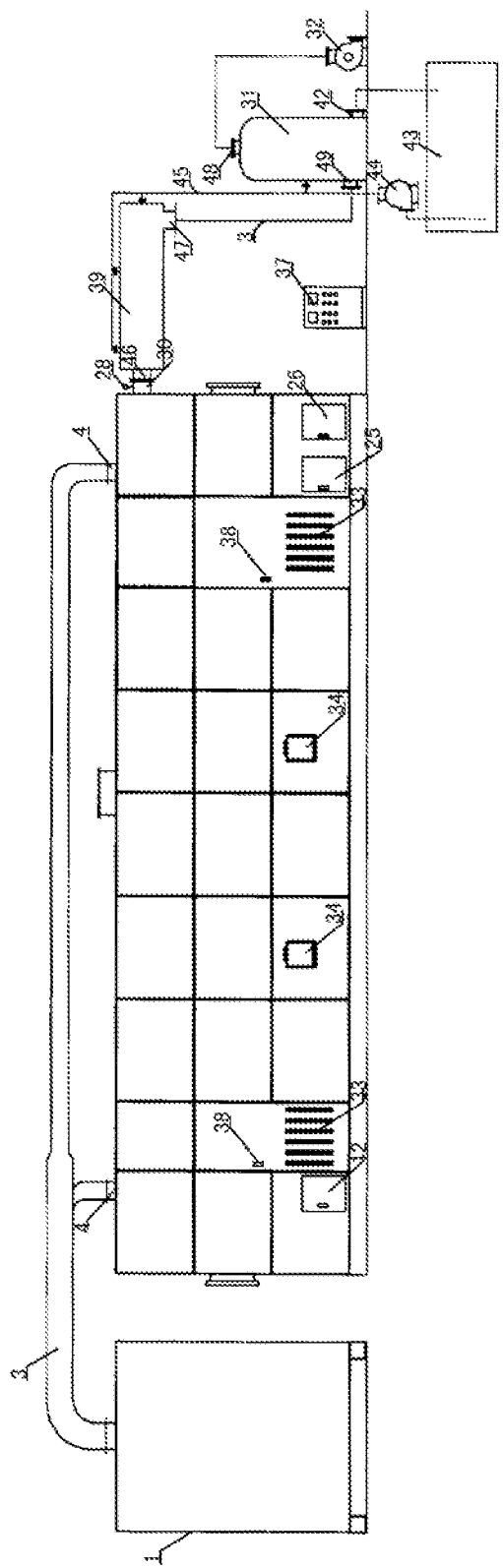
FIG. 2 is a perspective view of the device in accordance with the present invention.

As shown in FIGS. 1-3, they are schematic views of a device for dust collecting and cooling an active coke regeneration apparatus of the present invention. A feeding chamber 29, a discharge chamber 7, a front mechanical room 23 and a rear mechanical room 18 are provided at two opposite ends of the active coke regeneration apparatus 21.

A front negative dust collecting chamber 27 is located in middle of the feeding chamber 29 and the front mechanical room 23, whereas a spacer plate 17 is arranged between the feeding chamber 29 and the front negative pressure dust collecting chamber 27.

A rear negative dust collecting chamber 5 is located in middle of the discharge chamber 7 and the rear mechanical room 18, whereas a spacer plate 17 is arranged between the discharge chamber 7 and the rear negative pressure dust collecting chamber 5.

A combustion room 22 is located in middle of the front mechanical room 23 and the rear mechanical room 18, whereas a combustion apparatus 34 is disposed outside of the combustion room 22.

The drum 20 extends from the feeding chamber 29 to the discharge chamber 7 in a fore-and-aft direction. Inside and outside of a connecting location of the drum 20 with the feeding chamber 29 both are provided with a sealing device 24 for the feeding chamber. A connecting location of the drum 20 with the discharge chamber 7 is provided with a sealing device 8 for the discharge chamber, at a side of the rear negative pressure dust collecting chamber 5. The sealing devices 8 and 24 of the present invention are configured to be labyrinth sealing devices and/or scale type sealing device as well known in the art.

A retention ring 10 is installed onto one end of the drum 20 inside of the discharge chamber 7, and a tripper plate 6 in a semicircular shape is installed above a discharge port of the drum 20.

A supporting ring 15, a supporting roller 14, a vent pipe 9, a service door 38 and a ventilation hole 33 all are mounted within the front mechanical room 23.

The rear mechanical room 18 is provided with a supporting ring 15, a supporting roller 14, a gear ring 19, a drive motor 13, a vent pipe 9, a service door 39 and a ventilation hole 33.

A cleaning door 26 is located beneath the feeding chamber 29, a side of which is provided with a vapour outlet 30. The vapour outlet 30 is mounted with a pressure sensor 28. At the outside of the vapour outlet 30, a condenser 39 is installed. The condenser 39 is connected to a tri-phase separator 31 by a mixed vapour pipeline 3. The tri-phase separator 31 is provided with an induced draft fan 32 and a gas outlet 48 is arranged on top of the tri-phase separator 31. A gas-liquid inlet 49 and a solid-liquid outlet 42 are respectively located at the lower part of the tri-phase separator 31, and a defogger 41 and a nozzle 40 are installed within the tri-phase separator 31. The gas outlet 48 is connected with the induced draft fan 32, and the nozzle 40 is connected to a water supplying pump 44 by a water supplying pipe 45, and the solid-liquid outlet 42 is connected with the sedimentation tank 43. The defogger 41 of the present invention is folded plate type or screen type defogger as well known in the art.

A vapour inlet 46 is provided at one end of the condenser 39, and a discharge port 47 is provided at the other end of the condenser 39. Along an axis of the condenser 39, nozzles 40 are respectively arranged within the condenser 39, at a side of the vapour net 46, in the middle of the condenser 39 and at a side of the discharge port 47, and the nozzles 40 are connected with the water supplying pump 44 by the water supplying pipe 45.

Dust collecting ports 4 are installed on top of the front and rear negative pressure dust collecting chambers 27 and 5, and connected with the dust collecting apparatus 1 by a dust collecting pipeline 2. A cleaning door 25 is located at the lower part of the front negative pressure dust collecting chamber 27, whereas a cleaning door 12 is located at the lower part of the rear negative pressure dust collecting chamber 5.

The drive motor 13, the induced draft fan 32, the dust collecting apparatus 1, the pressure sensor 28 are connected with a control cabinet 37.

When the regeneration apparatus 21 is in operation, water, organic matters or the like contained in the active coke in the drum 20 vaporize and perform pyrolysis, generating a dust gas 35 consisted of water, non-condensable combustible gas, powders of the active coke and so on.

When the induced draft fan 32 of the tri-phase separator 31 is operating, a negative pressure is created at the vapour outlet 30 of the feeding chamber 29 by the tri-phase separator 31, the mixed vapour pipeline 3 and the condenser 39. The negative pressure at the vapour outlet 30 is controlled by rotational speed of the induced draft fan 32 which is controlled and adjusted by signals from the pressure sensor via the control cabinet 37.

When the dust collecting apparatus 1 is running on, a negative pressure is generated at the front and rear negative pressure dust collecting chambers 27 and 5 respectively by the dust collecting pipeline 2.

The dust gas 35 in the drum 20 entrained with dust flows toward the feeding chamber 29 and the discharge chamber 7, under the action of the pressure caused by gas expansion.

Most of the dust gas 35 flowing into the feeding chamber 29, under the action of negative pressure of the vapour outlet 30, flows into the tri-phase separator 31 through the vapour outlet 30, the condenser 39 and the mixed vapour pipeline 3, so as to be purified, condensed, and separated. A small part of the dust gas 35 flowing into the feeding chamber 29 leaks out from gaps between the sealing device 24 and the drum 20, enters the front negative pressure dust collecting chamber 27, and flows into the dust collecting apparatus 1 through the dust collecting port 4 and the dust collecting pipeline 2 under the action of the negative pressure of the dust collecting apparatus 1, so as to be purified.

Under the negative pressure from the vapour outlet 30, most of the dust gas 35 in the drum 20 flows toward the feeding chamber 29. When the drum 20 is under a positive pressure, the discharge chamber 7 is also filled up with the dust gas 35. This dust gas 35 would leak out into the rear negative pressure dust collecting chamber 5 from the gaps between the sealing device 8 and the drum 20, and flow into the dust collecting apparatus 1 through the dust collecting port 4 and the dust collecting pipeline 2, under the negative pressure of the dust collecting apparatus 1, so as to be purified.

The drum 20 passes from the front mechanical room 23 to the rear mechanical room 18. The thermal energy from the surface of the drum 20 will heat up the front and rear mechanical rooms 23 and 18, so as to increase the temperature thereof. In order to avoid the temperatures within the front and rear mechanical rooms 23 and 18 too high, and affecting the normal operation of the supporting roller 14 and the drive motor 13, or the like, a ventilation pipe 9 is installed within the front and rear mechanical rooms 23 and 18. An air inlet 16 of the ventilation pipe 19 is located at an upper part of the front and rear mechanical rooms 23 and 18, and an air outlet 11 of the ventilation pipe 9 is located within the front and rear negative pressure dust collecting chambers 23 and 5. When the regeneration apparatus 21 is in operation, cooling air 36 enters the front and rear mechanical rooms 23 and 18 from below through ventilation holes 33 onto a service door 38, and at the same time flows upwardly within the front and rear mechanical rooms 23 and 18. Then such cooling gas enters the ventilation pipe 9 from the air net 16, flows into the front and rear negative pressure dust collecting chambers 23 and 5 from the air outlet 11 of the ventilation pipe 9, and then flows into the dust collecting apparatus 1 through the dust collecting port 4 and the dust collecting pipeline 2, under the negative pressure of the dust collecting apparatus 1, so as to be purified.

In order to avoid the dust within the feeding chamber 29 falling onto the drum 20 and entering the front negative pressure dust collecting chamber 27 along with the rotation of the drum 20, the sealing device 24 is installed onto an inner wall of the feeding chamber 29. In order to avoid the dust within the discharge chamber 7 falling onto the drum 20 and entering the rear negative pressure dust collecting chamber 5 along with the rotation of the drum 20, the retention ring 10 is installed onto the drum 20 within the discharge chamber 7. The semicircular shaped striker plate 6 is installed onto a wall of the discharge chamber 7 above the drum 20. On one hand, it is possible to reduce the dust falling onto the drum 20; on the other hand, it is also possible to reduce the dust leaking out into the rear negative pressure dust collecting chamber 5 through the gaps between the sealing device 8 and the drum 20.

When the regeneration apparatus 21 is operating, in order to prevent the dust in the dust gas 35 from attaching to the wall of the mixed vapour pipeline 3, thus resulting in frequent blocking to it, and to avoid not discharging the dust gas 35 in time, a condenser 39 is mounted outside the vapour outlet 30. The water vapour in the dust gas 35 which flows into the condenser 39, becomes condensed water under the action of water mist ejected from the nozzle 40. The dust in the dust gas 35 enters the tri-phase separator 31 from the discharge port 47, the mixed vapour pipeline 3 and the gas-liquid inlet 49, under scouring action of the water mist, the condensed water and the cooling water ejected from the nozzle 40; and then after further condensation and mist removing treatment of the nozzle 40 in the tri-phase separator 31 and the defogger 4, the dust as well as the water flow into the sedimentation tank 43 from the solid-liquid outlet 42 in the tri-phase separator 31, whereas the remaining dry gas is discharged from the gas outlet 48 above the tri-phase separator 31. The water in the sedimentation tank 43 is transported to the nozzle 40 through the water supplying pipeline 45 by the water pump 44.

When the regeneration apparatus 21 is operating, the control cabinet 37 controls the operation of the induced draft fan 32 and the dust collecting apparatus 1 in accordance with the signals from the pressure sensor 28, so that the drum 20, the feeding chamber 29, the front negative pressure dust collecting chamber 27, the drum 20, the discharge chamber 7 and the rear negative pressure dust collecting chamber 5 mutually keep a normal pressure difference between.

(1) It is possible to avoid that when the rotational speed of the induced draft fan 32 becomes too high, the negative pressure in the feeding chamber 29 and the drum 20 becomes too high, so that the air flows into the discharge chamber 7, the drum 20, the feeding chamber 29 through the gaps between the sealing device 24 of the front negative pressure dust collecting chamber 27 and the drum 20, and the gaps between the sealing device 8 of the rear negative pressure dust collecting chamber 5 and the drum 20. In the above way, it would cause erosion of the active coke and increase discharge amount of the dust.

(2) It is possible to avoid that when the suction force of the dust collecting apparatus 1 becomes too large, the negative pressures in the front and rear negative pressure dust collecting chambers 27 and 5 becomes too high. Therefore, this would increase the amount of the dust flowed through the gaps between the sealing device 24 and the drum 20, and between the sealing device 8 and the drum 20.

With the dust removing method and device as described above, when the regeneration apparatus is operating, by controlling the negative pressures in the front and rear negative pressure dust collecting chambers 27 and 5, the drum 20, the feeding chamber 29, the front negative pressure dust collecting chamber 27, the drum 20, the discharge chamber 7 and the rear negative pressure dust collecting chamber 5 mutually keep a normal pressure difference therebetween. The dust leaked out from the connecting parts between the drum 20 and the feeding chamber 29, and between the drum 20 and the discharge chamber 7 are collected, preventing the dust pollution in the regeneration workshop. Meanwhile, this arrangement can effectively prevent the dust flowing into the front and rear mechanical rooms 23 and 18, and thus maintaining surfaces of the mechanical equipment clean. Further, it is effective to avoid blocking of the transporting pipeline for the dust gas. The temperature of the mechanical equipment room is reduced by the flow of the cooling gas, and thus protecting the normal operation of the equipment.

What is claimed is:

1. A dust removing and cooling method for an active coke regeneration apparatus, the method comprising:
    operating the active coke regeneration apparatus, the active coke regeneration apparatus comprising:
    a feeding chamber and a discharge chamber, respectively provided at two opposite ends of the active coke regeneration apparatus;
    a front mechanical room, located between the feeding chamber and a combustion chamber;
    a rear mechanical room, located between the discharge chamber and the combustion chamber, wherein the combustion chamber is between the front mechanical room and the rear mechanical room;
    a drum, extending from the feeding chamber to the discharge chamber;
    a spacer plate, provided between the feeding chamber and the front mechanical room, forming a front negative pressure dust collecting chamber;
    a first ventilation pipe provided in the front mechanical room;
    an air inlet of the first ventilation pipe located in an upper part of the front mechanical room;
    an air outlet of the first ventilation pipe provided in the front negative pressure dust collecting chamber;
    another spacer plate, provided between the discharge chamber and the rear mechanical room, forming a rear negative pressure dust collecting chamber;
    a second ventilation pipe provided in the rear mechanical room;

an air inlet of the second ventilation pipe located in an upper part of the rear mechanical room;
an air outlet of the second ventilation pipe provided in the rear negative pressure dust collecting chamber;
two dust collecting ports, respectively provided on top of the front and rear negative pressure dust collecting chambers and connected to a dust collecting apparatus by respective dust collecting pipelines; and
a vapour outlet, provided at a side of the feeding chamber, and connected with an induced draft fan;
generating two negative pressure regions respectively at a discharge chamber end and a feeding chamber end of the active coke regeneration apparatus;
sucking out leaked vapour and dust by means of the negative pressure regions; and
cooling down the active coke regeneration apparatus using gas flow generated by negative pressure in the negative pressure regions.

2. A device for removing dust and cooling an active coke regeneration apparatus, comprising:
a feeding chamber and a discharge chamber, respectively provided at two opposite ends of the active coke regeneration apparatus;
a front mechanical room, located between the feeding chamber and a combustion chamber;
a rear mechanical room, located between the discharge chamber and the combustion chamber, wherein the combustion chamber is between the front mechanical room and the rear mechanical room;
a drum, extending from the feeding chamber to the discharge chamber;
a spacer plate, provided between the feeding chamber and the front mechanical room, forming a front negative pressure dust collecting chamber;
a first ventilation pipe provided in the front mechanical room;
an air inlet of the first ventilation pipe located in an upper part of the front mechanical room;
an air outlet of the first ventilation pipe provided in the front negative pressure dust collecting chamber;
another spacer plate, provided between the discharge chamber and the rear mechanical room, forming a rear negative pressure dust collecting chamber;
a second ventilation pipe provided in the rear mechanical room;
an air inlet of the second ventilation pipe located in an upper part of the rear mechanical room;
an air outlet of the second ventilation pipe provided in the rear negative pressure dust collecting chamber;
two dust collecting ports, respectively provided on top of the front and rear negative pressure dust collecting chambers and connected to a dust collecting apparatus by respective dust collecting pipelines; and
a vapour outlet, provided at a side of the feeding chamber, and connected with an induced draft fan.

3. The device according to claim 2, wherein sealing devices are installed inside and outside of a connecting location of the drum with the feeding chamber, and at a connecting location of the drum with the discharge chamber.

4. The device according to claim 2, wherein a combustion apparatus is arranged outside the combustion chamber.

5. The device according to claim 2, wherein a retention ring is mounted onto one end of the drum within the discharge chamber, and a striker plate in semicircular shape is provided at an upper part of the drum.

6. The device according to claim 2, wherein the front and rear mechanical rooms both are further mounted with a supporting ring, a supporting roller, a service door and a ventilation hole.

7. The device according to claim 2, wherein cleaning doors are respectively located beneath the feeding chamber, at a lower part of the front negative pressure dust collecting chamber and at a lower part of the rear negative pressure dust collecting chamber.

8. The device according to claim 2, wherein a discharge end of the drum is connected with a drive motor.

9. The device according to claim 8, wherein the drive motor, the induced draft fan, the dust collecting apparatus, a water supplying pump and a pressure sensor all are connected with a control cabinet.

10. The device according to claim 2, wherein the vapour outlet of the discharge chamber is installed with a pressure sensor, the vapour outlet is connected to a vapour inlet of a condenser, and a discharge port at another end of the condenser is connected with a tri-phase separator by a mixed vapour pipeline, wherein a vapour inlet on top of the tri-phase separator is connected with the induced draft fan, nozzles are installed within the condenser, respectively at a side of the vapour outlet, in a middle of the condenser, and at a side of a discharge port in the condenser, on an axis of the condenser, the nozzles being connected with a water supplying pump by a water supplying pipe.

* * * * *